(12) United States Patent
Zhao et al.

(10) Patent No.: US 7,224,860 B2
(45) Date of Patent: May 29, 2007

(54) MULTI-PORT OPTICAL SWITCHES

(76) Inventors: Jing Zhao, 20 Arbor La., Winchester, MA (US) 01890; Yongjun Shu, 9 Arizona Ter., Apt. #5, Arlington, MA (US) 02474

( * ) Notice: Subject to any disclaimer, the term of this patent is extended or adjusted under 35 U.S.C. 154(b) by 101 days.

(21) Appl. No.: 10/962,372

(22) Filed: Oct. 8, 2004

(65) Prior Publication Data

US 2005/0111785 A1    May 26, 2005

Related U.S. Application Data

(60) Provisional application No. 60/509,549, filed on Oct. 9, 2003.

(51) Int. Cl.
*G02B 6/27*    (2006.01)
*G02B 6/35*    (2006.01)

(52) U.S. Cl. ....................................... 385/17
(58) Field of Classification Search ................ None
See application file for complete search history.

(56) References Cited

U.S. PATENT DOCUMENTS

| | | | |
|---|---|---|---|
| 5,724,165 A | 3/1998 | Wu | 359/117 |
| 5,867,291 A | 2/1999 | Wu et al. | 359/124 |
| 5,912,748 A | 6/1999 | Wu et al. | 359/117 |
| 6,097,518 A | 8/2000 | Wu et al. | 359/128 |
| 6,134,358 A | 10/2000 | Wu et al. | 385/16 |
| 6,137,606 A | 10/2000 | Wu et al. | 359/124 |
| 6,166,838 A | 12/2000 | Liu et al. | 359/128 |
| 6,192,174 B1 | 2/2001 | Lee | 385/24 |
| 6,212,313 B1 | 4/2001 | Li | 385/24 |
| 6,275,312 B1 | 8/2001 | Derks et al. | 359/117 |
| 6,700,704 B2 * | 3/2004 | Estebe et al. | 359/484 |
| 6,920,258 B2 * | 7/2005 | Tai | 385/16 |
| RE38,809 E * | 10/2005 | Yao | 359/256 |

* cited by examiner

*Primary Examiner*—Sung Pak
*Assistant Examiner*—Jerry T. Rahll

(57) ABSTRACT

Optical switches which take multiple incoming optical signals and switch them to multiple output ports to realize multiple working states. For example, in a four by four switch embodiment, twenty-four working states can be selected. These switches rely on magneto-optically or electro-optically switching the beam polarizations from one state to another to rapidly change the light path. An optical signal is spatially split into two polarized beams by a birefringent element. These beams pass through a series of polarization rotation elements and recombine into output fibers, achieving polarization independent operation. A polarization beam splitter may be used as the key element to establish multi-port switching. Light bending devices that allow two fibers to be coupled to the light beams using a single lens may be used to achieve small fiber separation for compactness.

19 Claims, 14 Drawing Sheets

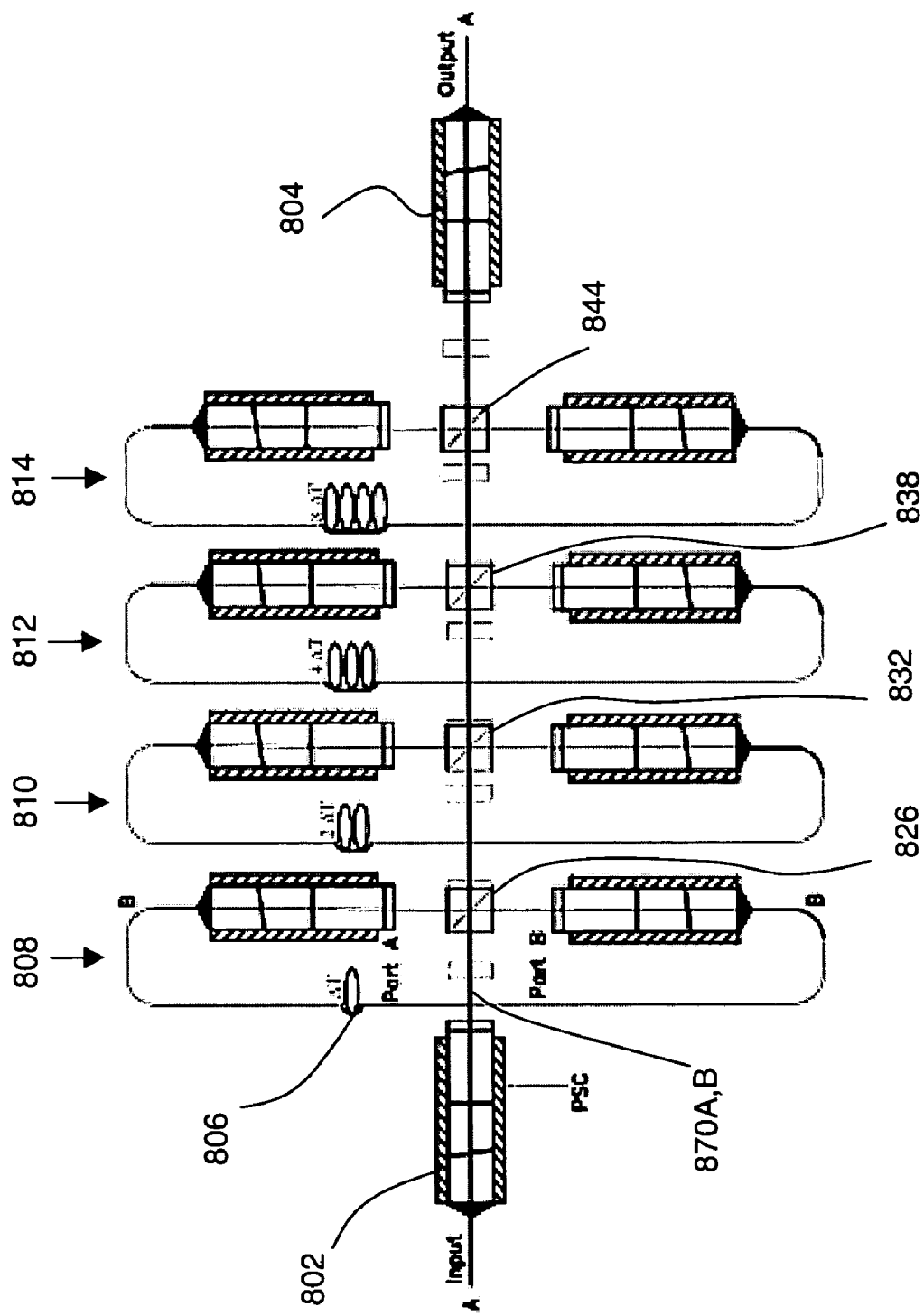

MULTI-PORT OPTICAL SWITCHES

CROSS REFERENCE TO RELATED APPLICATIONS

This application is related to and claims priority from U.S. provisional patent application 60/509,549, filed Oct. 9, 2003 and entitled "Multi-port optical switches", and incorporated by reference herein in its entirety.

FIELD OF THE INVENTION

The present invention is related to non-mechanical optical switches.

BACKGROUND

Optical switches are devices for directing optical signals along selected fibers of an optical network, in which light signals are transmitted along optical fibers to transfer information from one location to another. Desirable optical switch characteristics include: high speed switching, low optical insertion loss, long operation lifetime, small size, and low cost. Optical switches are key components in present-day optical networks, analogous to electrical switches in electrical networks. However, optical switches have not been widely adopted due to lack of reliability and to high cost associated with fabrication difficulty.

In an optical switch, light must be accurately coupled to an optical fiber to reduce loss. The alignment requirements of modern single mode optical fibers are particularly stringent, since their core diameters are typically as small as 2 to 10 microns and their acceptance angle is fairly narrow. Insertion loss due to switch-fiber misalignment reduces the amplitude of the optical signal. Therefore, optical switches which accept light from an input optical fiber, and which selectively couple that light to any of a plurality of output optical fibers, must transfer that light with precise alignment and within the small acceptance angle for light to efficiently couple to the fiber. Most prior art optical switches are based on mechanical movement to switch light beams, and consequently have drawbacks including slow switching time and reduced reliability. To avoid these drawbacks, it is desirable for optical switches to direct light beams without moving parts. Such lack of moving parts is a feature generally associated with high reliability and high speed.

Many types of non-mechanical optical switches have been developed for commercial applications, such as switches based on thermal heating, electro-optic phase retardation, and magneto-optic polarization rotation. These devices use various materials and configurations. Thermal heating based switches typically rely on thin film waveguide construction having a long interaction length (e.g., U.S. Pat. No. 5,892,863). This type of switch has a disadvantage of large insertion loss due to fiber to thin film waveguide coupling loss. On the other hand, a micro-optic assembly generally provides low optical loss. Liquid crystal materials have been demonstrated for optical path switching in a micro-optic platform. This type of organic device, however, has disadvantages including slow operation at low temperature and a requirement for a transparent electrode in the optical path (e.g., U.S. Pat. No. 4,917,452).

Oxide materials such as magneto-optic and electro-optic materials are particularly attractive for micro-optic devices. Inorganic materials are generally preferred over organic materials in optical network devices, due to their excellent stability. Optical switches based on magneto-optic crystals have been described in several patents (e.g., in U.S. Pat. Nos. 5,724,165, 5,867,291, 5,912,748, 6,097,518, 6,134,358, 6,137,606, 6,166,838, 6,192,174, 6,212,313, and 6,275,312). However, these optical switches are typically limited to a small number of ports (e.g., 1×2 and 2×2 configurations). Furthermore, even for a small number of optical ports, these configurations tend to be costly to manufacture due to tight fiber alignment tolerance requirements and complex configurations that require many optical elements.

Accordingly, it would be an advance in the art to provide a simple non-mechanical optical switch that is readily scalable to switches having more than 2 output (or input) ports and is suitable for volume production. It is particularly desirable to provide optical switches having a large number of ports, low optical insertion loss, and high speed switching that are also reliable and require only a small number of components which can be miniaturized and are easy to manufacture.

SUMMARY

The present invention provides a multi-port optical switch that can be efficiently coupled to multiple optical fibers using fewer parts and having more relaxed assembly tolerance requirements than the prior art. The inventive optical switch is capable of re-directing an incident signal light from an input port to any of multiple output ports, independent of its polarization state and without using moving parts. Key elements in an embodiment of the invention include: a polarization beam splitter (PBS), birefringent blocks, and polarization rotators (e.g., Faraday rotators and electro-optic retarders).

The polarization beam splitter generally can be used to separate a laser beam into two beams having orthogonal polarization. A variable beam splitter can be created by passing linearly polarized beams through a group of half wave plates and Faraday rotators in combination with a polarizing beam splitter. The polarization of the light incident on the polarization beam splitter governs the amount of light the beam splitter transmits and reflects. Adjusting the input polarization by changing the working state of the Faraday rotator allows full control of which incoming beams are transmitted and which are reflected by the beam splitter.

The birefringent blocks can be used as various functional elements in this invention. They can be used as a beam splitter to split one arbitrarily polarized beam into two orthogonally polarized beams with a certain distance between them. They can also be used as beam walk-off elements which shift one set of the polarized beams laterally to form a second path. They also can be used as beam combiners to re-combine two beams with orthogonal polarization together into a single beam. The inventive switches are based on electrically controllable polarization rotators. Suitable configurations include magneto-optic Faraday crystals or inorganic electro-optic materials as the controllable polarization rotator.

BRIEF DESCRIPTION OF THE DRAWINGS

FIG. 8a is a plan view of a 4 bit optical time delay line using single fiber collimators and PBSs in accordance with an embodiment of the invention.

FIG. 8b is an isometric view along line A—A on FIG. 8a.

FIG. 8c is an isometric view of part A along line B—B on FIG. 8a.

FIG. 8d is an isometric view of part B along line B—B on FIG. 8a.

DETAILED DESCRIPTION

Figure 1:
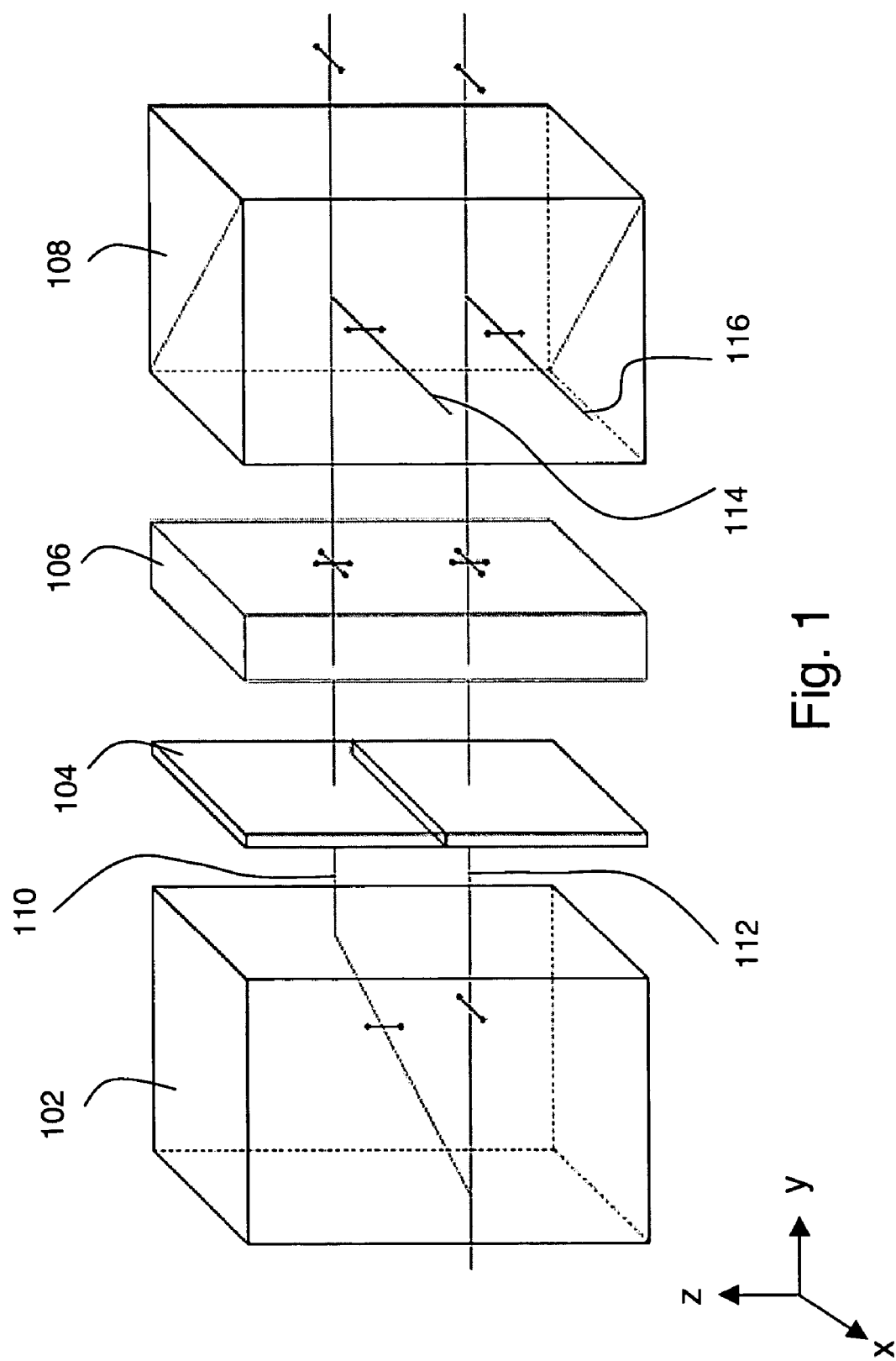
FIG. 1 shows an optical switch subassembly using a PBS for beam separation.

FIG. 1 shows an optical switch subassembly. A light beam incident on a first birefringent crystal 102 is split into two orthogonally polarized beams 110 and 112. The length of crystal 102 is selected to provide a spatial separation between beams 110 and 112, which permits these beams to pass through subsequent optical elements independently. Beams 110 and 112 then pass through a compound half wave plate 104 that rotates the polarization of beams 110 and 112 by 45 degrees in opposite directions. For example, if the polarization of beam 110 is rotated by +45 degrees (i.e., clockwise), then the polarization of beam 112 is rotated by −45 degrees (i.e., counter-clockwise). In the preceding example, +45 degrees and −45 degrees can be exchanged. After passing through wave plate 104, beams 110 and 112 have the same polarization.

Beams 110 and 112 next pass through an electrically controllable polarization rotator 106, which rotates the state of polarization by +45 degrees or −45 degrees, depending on an applied input signal. Beams 110 and 112 are either horizontally polarized (i.e., x-polarized) or vertically polarized (i.e., y-polarized) after exiting rotator 106, depending on the input signal to rotator 106. Beams 110 and 112 are next received by a polarizing beamsplitter (PBS) 108. If beams 110 and 112 are horizontally polarized, they pass through PBS 108 without a change in propagation direction. If beams 110 and 112 are vertically polarized, they are reflected in PBS 108 and exit PBS 108 as beams 114 and 116 propagating in a different direction than beams 110 and 112. Thus the input to rotator 106 controls the path the beams take through PBS 108, making this subassembly useful for optical switching. Splitting the input beam into two orthogonally polarized beams 110 and 112 ensures that this subassembly is applicable for arbitrarily polarized input light.

Figure 2:
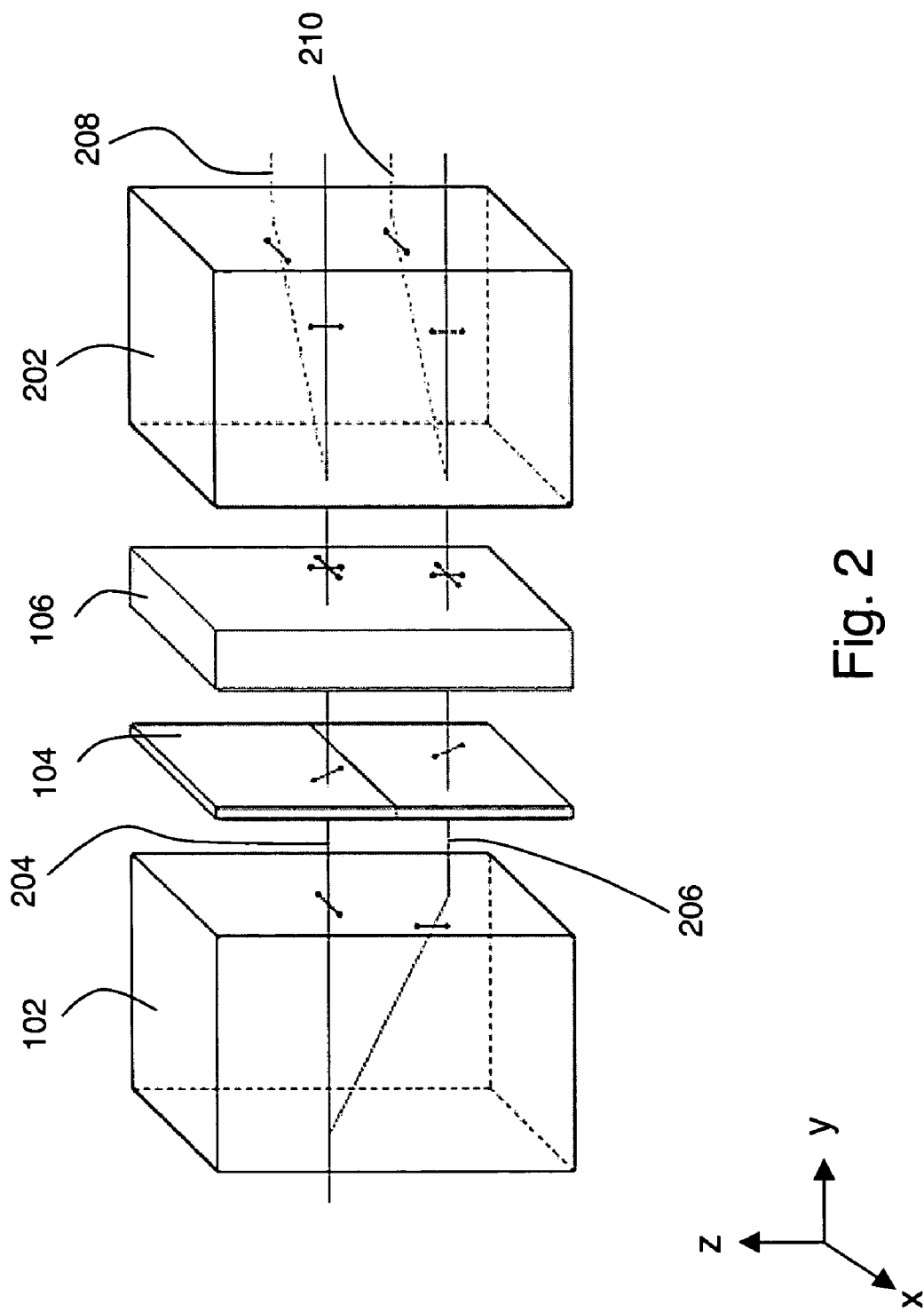
FIG. 2 shows an optical switch subassembly using a walkoff element for beam separation.

FIG. 2 shows an optical switch subassembly similar to that of FIG. 1. A light beam incident on a first birefringent crystal 102 is split into two orthogonally polarized beams 204 and 206. The length of crystal 102 is selected to provide a spatial separation between beams 204 and 206, which permits these beams to pass through subsequent optical elements independently. Beams 204 and 206 then pass through a compound half wave plate 104 that rotates the polarization of beams 204 and 206 by 45 degrees in opposite directions. After passing through wave plate 104, beams 204 and 206 have the same polarization.

Beams 204 and 206 next pass through an electrically controllable polarization rotator 106, which rotates the state of polarization by +45 degrees or −45 degrees, depending on an applied input signal. Beams 204 and 206 are either horizontally polarized or vertically polarized after exiting rotator 106, depending on the input signal to rotator 106. Beams 204 and 206 are next received by a second birefringent element 202. If beams 204 and 206 are vertically polarized, they pass through birefringent element 202 without a change in beam axis position. If beams 204 and 206 are horizontally polarized, they experience walk off and exit birefringent element 202 as beams 208 and 210 which are laterally displaced from beams 204 and 206. Thus the input to rotator 106 controls the path the beams take through birefringent element 202, making this subassembly useful for optical switching. Splitting the input beam into two orthogonally polarized beams 204 and 206 ensures that this subassembly is applicable for arbitrarily polarized input light.

Appreciation of the switch subassemblies of FIGS. 1 and 2 is helpful for appreciating the exemplary embodiments of the invention which follow.

Figure 3:
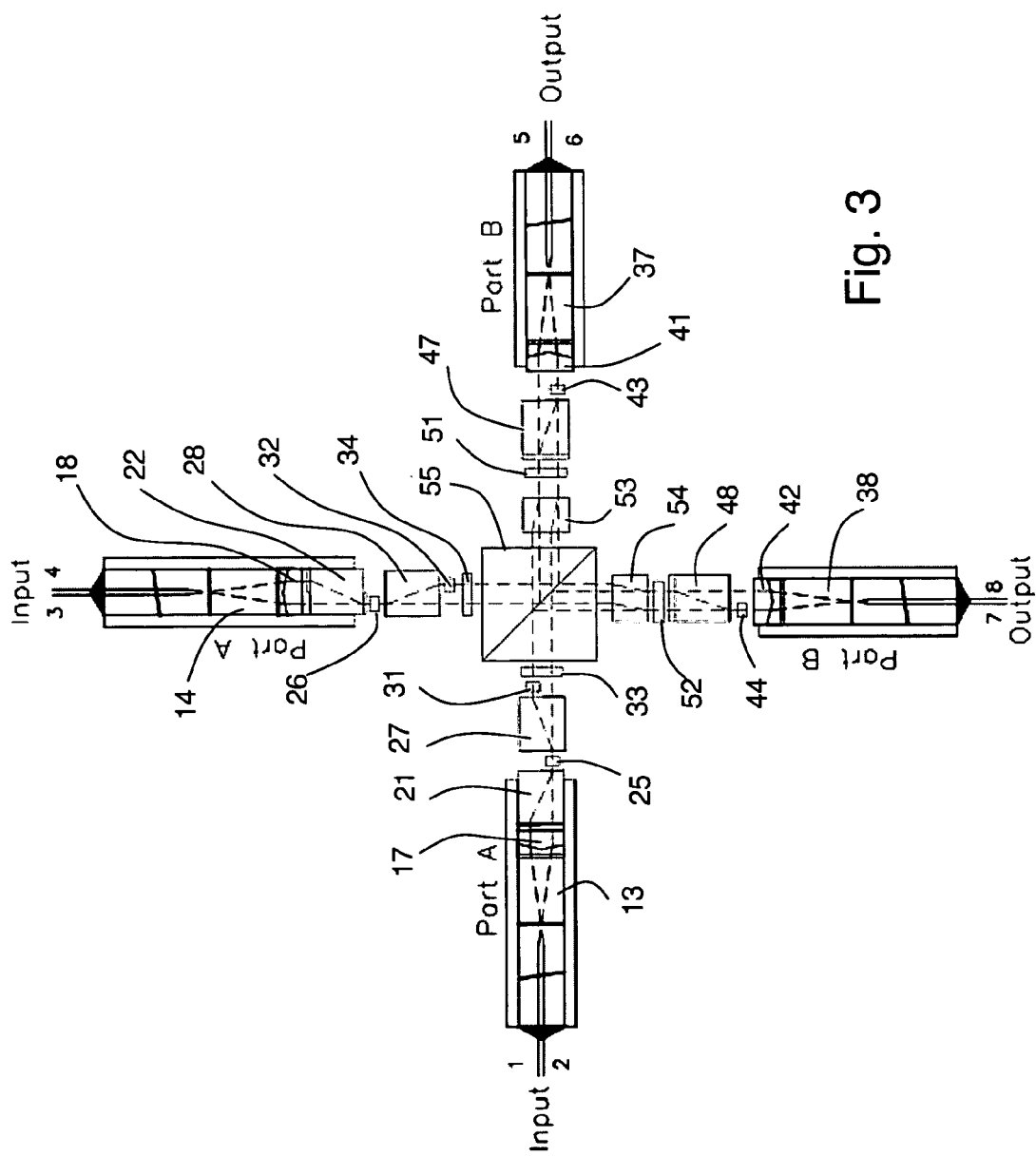
FIG. 3 is a plan view of an eight-port four by four optical switch in accordance with an embodiment of the invention.
Figure 4:
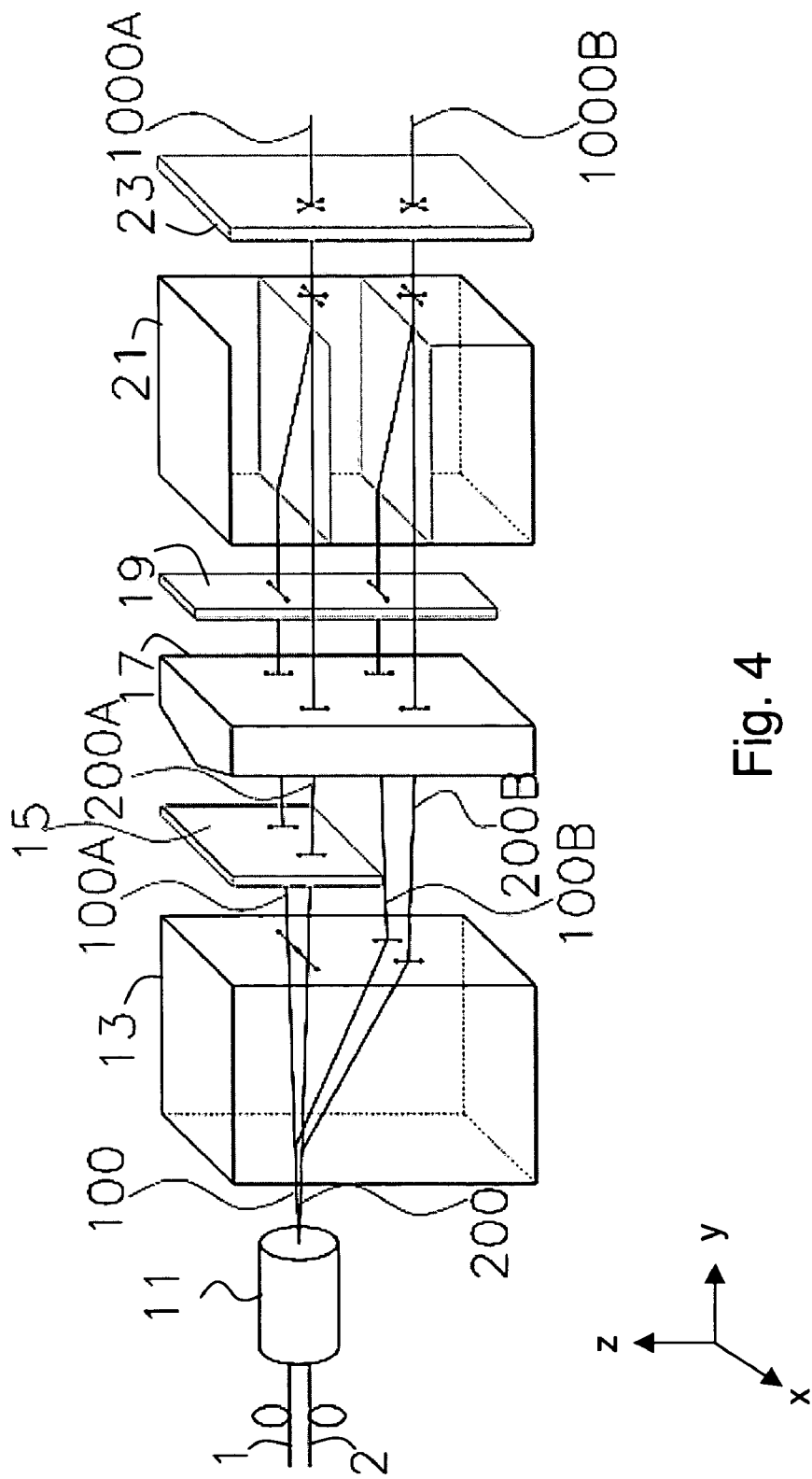
FIG. 4 is an isometric view of one of the input subassemblies of the switch of FIG. 3, showing the polarization of light after each component.
Figure 5:
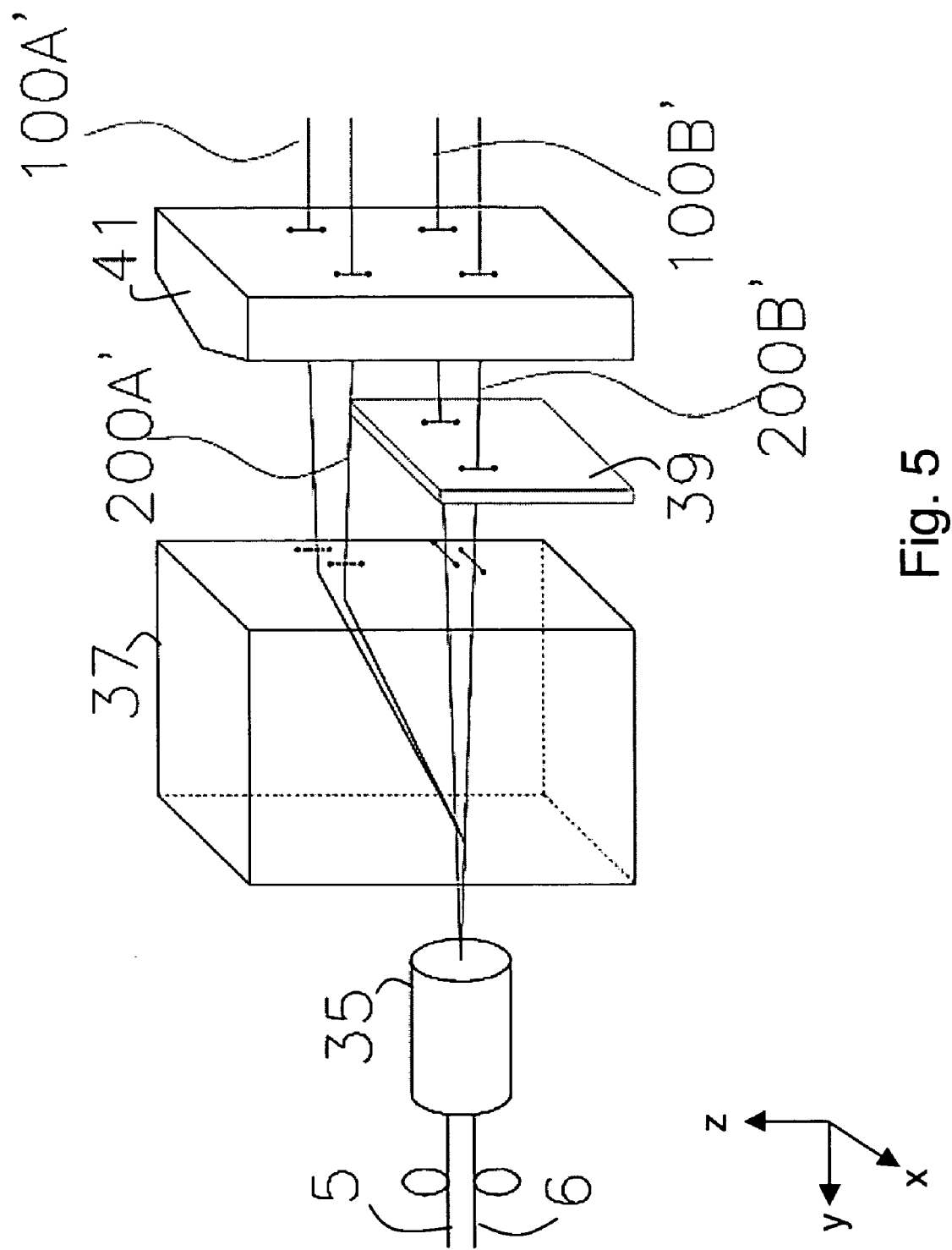
FIG. 5 is an isometric view of one of the output subassemblies of the switch of FIG. 3, showing the polarization of light after each component.
Figure 6:
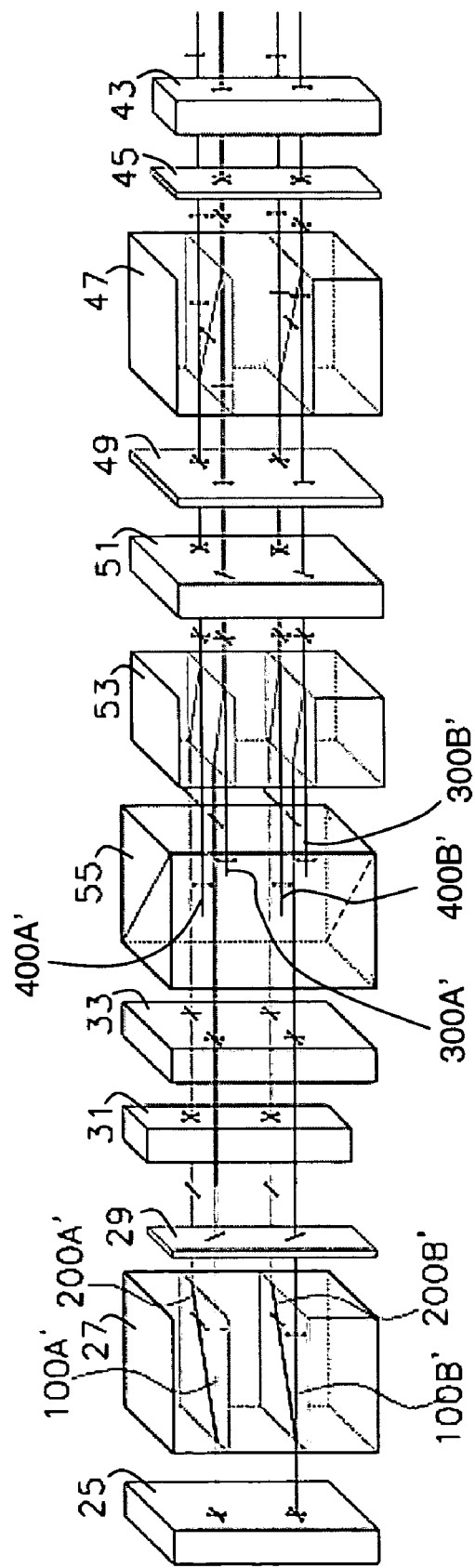
FIG. 6 is an isometric view of part of the center subassembly of the switch of FIG. 3, showing the polarization of light after each component.

FIG. 3 shows an eight-port, four by four optical switch according to an exemplary embodiment of the invention. On FIG. 3, two input subassemblies (part A) and two output subassemblies (part B) are connected to a central subassembly in a generally cross-like configuration. Details of the input subassemblies are shown on FIG. 4, details of the output subassemblies are shown on FIG. 5, and details of the central subassembly are shown on FIG. 6. In the example of FIG. 3, the two input subassemblies have the same optical configuration, as do the two output subassemblies. Thus the following description of the input subassembly is applicable to both input subassemblies on FIG. 3, and similarly for the output subassemblies. FIGS. 4–6 show and provide reference numbers for some optical components which are included in this embodiment of the invention but are not shown on FIG. 3.

FIG. 4 shows an input subassembly of the switch of FIG. 3. A first optical fiber 1 is inserted into a first dual fiber collimator 11 and a second optical fiber 2 is inserted into dual fiber collimator 11 adjacent to fiber 1, so that fiber 1 and fiber 2 are parallel. Dual fiber collimator 11 allows the outputs of the two fibers to be transformed to collimated beams with a single lens, thereby providing small fiber separation for compactness.

Fiber 1 emits an arbitrarily polarized light beam 100 that is collimated by a collimator 11. Collimator 11 also causes beam 100 to make an angle with respect to the y-axis (since fiber 1 is off-axis with respect to the lens of collimator 11). Beam 100 then passes through a first birefringent block 13 and is divided into two beams having orthogonal polarizations, specifically beams 100A and 100B. The relative intensity of beams 100A and 100B depends on the state of polarization of light emitted from fiber 1. The length of birefringent block 13 is selected to provide a spatial separation between beams 100A and 100B. This spatial separation permits beams 100A and 100B to pass through independent optical elements. In this example, beam 100A enters a first wave plate 15 which rotates its plane of polarization by 90°, while beam 100B does not pass through wave plate 15. Thus wave plate 15 makes beams 100A and 100B have the same state of polarization (z-axis).

Since beam 100 makes an angle with respect to the y-axis, beams 100A and 100B also make an angle with respect to the y-axis. This angle is removed by passing beams 100A and 100B through a polarization-independent light-bending device 17. In the example of FIG. 4, light bending device 17 is a prism having an angle selected such that beams 100A and 100B are parallel to the y axis after passing through device 17. Beams 100A and 100B next pass through a second wave plate 19, which rotates their plane of polarization by 90°. Thus beams 100A and 100B propagate parallel to each other and are x-axis polarized after passing through wave plate 19.

Similarly, fiber 2 emits an arbitrarily polarized light beam 200 that is collimated by collimator 11. Collimator 11 also causes beam 200 to make an angle with respect to the y-axis (since fiber 2 is off-axis with respect to the lens of collimator 11). Beam 200 then passes through first birefringent block 13 and is divided into two beams having orthogonal polarizations, specifically beams 200A and 200B. The relative intensity of beams 200A and 200B depends on the state of polarization of light emitted from fiber 2. The length of birefringent block 13 is selected to provide a spatial separation between beams 200A and 200B. This spatial separation permits beams 200A and 200B to pass through independent optical elements. In this example, beam 200A enters first wave plate 15 which rotates its plane of polarization by 90°, while beam 200B does not pass through wave plate 15. Thus wave plate 15 makes beams 200A and 200B have the same state of polarization (z-axis).

Since beam 200 makes an angle with respect to the y-axis, beams 200A and 200B also make an angle with respect to the y-axis. This angle is removed by passing beams 200A and 200B through a polarization-independent light-bending device 17. In the example of FIG. 4, light bending device 17 is a prism having an angle selected such that beams 200A and 200B are parallel to the y axis after passing through device 17. Beams 200A and 200B do not pass through second wave plate 19. Thus beams 200A and 200B propagate parallel to each other and are z-axis polarized after passing through device 17.

The four beams 100A, 100B and 200A, 200B pass through a second birefringent block 21, where beams 100A and 200A are combined into one beam 1000A and beams 100B and 200B are combined into another beam 1000B. After this combination, a third half wave plate 23 rotates the polarizations of beams 1000A and 1000B by 45° clockwise. Thus, beams 100 and 200 from fibers 1 and 2 are mixed with each other to form two parallel beams 1000A and 1000B separated along the z-axis. More specifically, beams 1000A and 1000B each have two orthogonal polarization components, which can be referred to as +D and −D (in view of the 45 degree rotation of wave plate 23) components. Light from fiber 1 is split between the +D components of beams 1000A and 1000B, while light from fiber 2 is split between the −D components of beams 1000A and 1000B. The roles of +D and −D can be reversed in the preceding sentence. Providing such combined beams 1000A,B is the main function of the two input subassemblies on FIG. 3.

FIG. 6 shows a view of the central subassembly of the switch of FIG. 3 along a line from ports 1 and 2 to ports 5 and 6. Beams 1000A and 1000B (from FIG. 4) are received by a first electrically controllable polarization rotator 25 that rotates the plane of polarization by 45° clockwise (or counter-clockwise), depending on an applied electrical control signal. Beams 1000A and 1000B then pass through a birefringent splitter 27 which splits beam 1000A into beams 100A' and 200A', and splits beam 1000B into beams 100B' and 200B'. When rotator 25 performs a 45° clockwise rotation of the plane of polarization, z-polarized beams 100A' and 100B' come from beam 100 on FIG. 4, and x-polarized beams 200A' and 200B' come from beam 200 on FIG. 4. When rotator 25 performs a 45° counter-clockwise rotation of the plane of polarization, z-polarized beams 100A' and 100B' come from beam 200 on FIG. 4, and x-polarized beams 200A' and 200B' come from beam 100 on FIG. 4. Thus the setting of rotator 25 determines the relation between beams 100 and 200 on FIG. 4 and beams 100A' and 100B' and beams 200A' and 200B' on FIG. 6. In either case, beams 100A' and 100B' pass through birefringent splitter 27 as ordinary waves, and beams 200A' and 200B' pass through birefringent splitter 27 as extraordinary waves. Thus beams 200A' and 200B' experience an x-directed walkoff that spatially separates them from beams 100A' and 100B'.

Beams 100A' and 100B' pass through a half wave plate 29, which rotates the plane of polarization by 45 degrees clockwise. Beams 200A' and 200B' pass through a second electrically controllable polarization rotator 31 which rotates the plane of polarization by 45 degrees clockwise or counter-clockwise, depending on an applied control signal. Then beams 100A', 100B', 200A', and 200B' pass through a third electrically controllable polarization rotator 33 which rotates the plane of polarization by 45 degrees clockwise or counter-clockwise, depending on an applied control signal.

The combination of half wave plate 29 and polarization rotators 31 and 33 acts as a compound polarization rotator that can change the polarization of the beams 100A', 100B', 200A', 200B' in four different ways, depending on the applied electrical signals. When rotators 31 and 33 both rotate polarization by +45°, beams 100A' and 100B' are x-polarized, and beams 200A' and 200B' are z-polarized (i.e., the polarizations of beams 100A',B' and beams 200 A',B' are exchanged). When rotators 31 and 33 both rotate polarization by −45°, beams 100A' and 100B' are z-polarized, and beams 200A' and 200B' are z-polarized (i.e., all beams are z-polarized). When rotator 31 rotates polarization by +45° and rotator 33 rotates by −45°, beams 100A' and 100B' are z-polarized, and beams 200A' and 200B' are x-polarized (i.e., the polarizations of beams 100A',B' and beams 200 A',B' are unchanged). When rotator 31 rotates polarization by −45° and rotator 33 rotates by +45°, beams 100A' and 100B' are x-polarized, and beams 200A' and 200B' are x-polarized (i.e., all beams are x-polarized).

Beams 100A', 100B', 200A', and 200B' are then received by a polarization beamsplitter (PBS) 55, which in this example transmits x-polarized light and reflects z-polarized light through an angle of 90 degrees. Thus polarization rotator 25 acts as a 2×2 switch to determine which side (left or right) of PBS 55 beams 100 and 200 are directed to. This function can be used to switch between the two ports of a dual fiber collimator (e.g., fibers 1 and 2). Rotators 31 and 33 determine whether light on the left side of PBS 55 is transmitted or reflected, and also whether or not light on the right side of PBS 55 is transmitted or reflected. The four cases considered above show that all possibilities are accounted for.

The discussion to this point has followed the optical path from input fibers 1 and 2 to PBS 55. As shown on FIG. 3, input fibers 3 and 4 also provide optical beams which are received by PBS 55. The optical components between fibers 3 and 4 and PBS 55 are the same as between fibers 1 and 2 and PBS 55. For example, elements 14, 18, 22, 26, 28, 32, and 34 correspond to elements 13, 17, 21, 25, 27, 31, and 33 respectively. Therefore, the above description in connection with FIGS. 4 and 6 of the optical elements between fibers 1 and 2 and PBS 55 is also applicable to the optical elements between fibers 3 and 4 and PBS 55. Accordingly, PBS 55 also receives beams 300A', 300B', 400A', and 400B' from fibers 3 and 4, as shown on FIG. 6. Beams 300A', 300B', 400A', and 400B' are switchably related to fibers 3 and 4 in the same way that beams 100A', 100B', 200A', and 200B' are switchably related to fibers 1 and 2. Similarly, the polarization of beams 300A', 300B', 400A', and 400B' is switchable in the same way as the polarization of beams 100A', 100B', 200A', and 200B'.

These beams then pass through a birefringent combiner 53, a fourth electrically controllable polarization rotator 51, a half-wave plate 49, a birefringent splitter 47, a half-wave plate 45 and a fifth electrically controllable polarization rotator 43 in succession. The operation of these elements is best appreciated by considering three cases. In case 1, input fibers 1 and 2 are coupled to output fibers 5 and 6. In case 2, input fibers 3 and 4 are coupled to output fibers 5 and 6. In case 3, one of output fibers 5 and 6 is coupled to input fiber 1 or 2, and the other of output fibers 5 and 6 is coupled to input fiber 3 or 4.

In case 1, beams 100A', 100B', 200A', and 200B' are x-polarized as they pass through PBS 55. These beams remain x-polarized as they pass through combiner 53, and experience walkoff. For this case, rotator 51 rotates the polarization by +45 degrees, as does half-wave plate 49, thus making the beams z-polarized when exiting wave plate 49. These z-polarized beams pass through birefringent splitter 47 without walkoff. Beams 100A' and 100B' then pass through waveplate 45 which rotates the polarization by +45 degrees, and through rotator 43 which is set to rotate the polarization by −45 degrees. Thus beams 100A', 100B', 200A', and 200B' are all z-polarized after rotator 43. Note that beams 100A' and 100B' come from fiber 1 and beams 200A' and 200B' come from fiber 2 (or vice versa) based on the setting of rotator 25.

In case 2, beams 300A', 300B', 400A', and 400B' are z-polarized as they are reflected in PBS 55 toward fibers 5 and 6. These beams remain z-polarized as they pass through combiner 53, and do not experience walkoff. The length of combiner 53 is selected to ensure that the beams exiting combiner 53 have the same position for both cases 1 and 2. For this case, rotator 51 rotates the polarization by −45 degrees, and half-wave plate 49 rotates the polarization by +45 degrees, thus making the beams z-polarized when exiting wave plate 49. These z-polarized beams pass through birefringent splitter 47 without walkoff. Beams 300A' and 300B' then pass through waveplate 45 which rotates the polarization by +45 degrees, and through rotator 43 which is set to rotate the polarization by −45 degrees. Thus beams 300A', 300B', 400A', and 400B' are all z-polarized after rotator 43. Note that beams 300A' and 300B' come from fiber 3 and beams 400A' and 400B' come from fiber 4 (or vice versa) based on the setting of rotator 26.

In case 3, beams 200A' and 200B' are x-polarized as they pass through PBS 55 and beams 400A' and 400B' are z-polarized as they are reflected in PBS 55 toward fibers 5 and 6. These beams are combined as they pass through combiner 53, since beams 200A' and 200B' experience walkoff relative to beams 400A' and 400B'. For this case, rotator 51 rotates the polarization by −45 degrees, and half-wave plate 49 rotates the polarization by +45 degrees or −45 degrees, thus providing either a 0 degree or a 90 degree polarization rotation through elements 51 and 49. This combined beam is split by splitter 47 such that beams 200A' and 200B' are separated from beams 400A' and 400B'. Beams 200A' and 200B' then pass through waveplate 45 which rotates the polarization by +45 degrees, and through rotator 43 which is set to rotate the polarization by +45 degrees. Thus beams 200A', 200B', 400A', and 400B' are all z-polarized after rotator 43. Note that beams 200A' and 200B' come from fiber 1 or 2 based on the setting of rotator 25 and beams 400A' and 400B' come from fiber 3 or 4 based on the setting of rotator 26. Also note that beams 400A', and 400B' instead of beams 200A' and 200B' will walk off in element 47 if elements 51 and 49 provide a 90 degree polarization rotation. Thus beams 200A',B' and 400A',B' exiting from splitter 47 can be laterally exchanged with each other based on the setting of rotator 51. This degree of freedom permits switchable coupling between fibers 5 and 6 and beams 200A',B' and 400A',B'.

FIG. 5 shows an output subassembly of the switch of FIG. 3. On FIG. 5, beams propagate from right to left. Beams 100A', 100B', 200A', and 200B' (e.g., case 1 above) exiting from rotator 43 on FIG. 6 are received by a polarization-independent light-bending device 41. Light bending device 41 deflects these beams so that they make an angle θ with respect to the y-axis. The angle θ is selected to provide efficient coupling into fibers 5 and 6. Beams 100B' and 200B' enter a wave plate 39 which rotates the polarization of these beams by 90 degrees. Orthogonally polarized beams 100A' and 100B' next enter a birefringent block 37, which combines these two beams into a single beam that is focused onto fiber 5 by a dual fiber collimator 35. Similarly, orthogonally polarized beams 200A' and 200B' also enter birefringent block 37, which combines these two beams into a single beam that is focused onto fiber 6 by the collimator 35. Dual fiber collimator 35 allows two collimated beams to be coupled to two fibers with a single lens, thereby providing small fiber separation for compactness. The arrangement of FIG. 5 operates in the same way for the three switching cases considered above.

The discussion in connection with FIGS. 5 and 6 has followed the optical path from PBS 55 to output fibers 5 and 6. As shown on FIG. 3 and discussed above, PBS 55 can also provide beams which are received by output fibers 7 and 8. The optical components between PBS 55 and fibers 7 and 8 are the same as between PBS 55 and fibers 5 and 6. For example, elements 54, 52, 48, 44, 42, and 38 correspond to elements 53, 51, 47, 43, 41, and 37 respectively. Therefore, the above description in connection with FIGS. 6 and 5 of the optical elements between PBS 55 and fibers 5 and 6 is also applicable to the optical elements between PBS 55 and fibers 7 and 8.

Thus optical paths from fiber 1 to fiber 5 and from fiber 2 to fiber 6 (or from fiber 1 to fiber 6 and from fiber 2 to fiber 5) are established when appropriate control signals are applied to the electrically controllable Faraday rotators 25, 31, 33, 51 and 43. Similarly, optical paths from fiber 1 to fiber 7 and from fiber 2 to fiber 8 (or from fiber 1 to fiber 8 and from fiber 2 to fiber 7) are established when appropriate control signals are applied to the electrically controllable Faraday rotators 25, 31, 33, 52 and 44. Likewise, optical paths from fiber 3 to fiber 5 and from fiber 4 to fiber 6 (or from fiber 3 to fiber 6 and from fiber 4 to fiber 5) are established when appropriate control signals are applied to the electrically controllable Faraday rotators 26, 32, 34, 51 and 43. Finally, optical paths from fiber 3 to fiber 7 and from fiber 4 to fiber 8 (or from fiber 3 to fiber 8 and from fiber 4 to fiber 7) are established when appropriate control signals are applied to the electrically controllable Faraday rotators 26, 32, 34, 52 and 44. Thus the inputs 1,2,3,4 can be coupled to the outputs 5,6,7,8 in any of twenty four ways by the switch of FIG. 3.

Figure 7A:
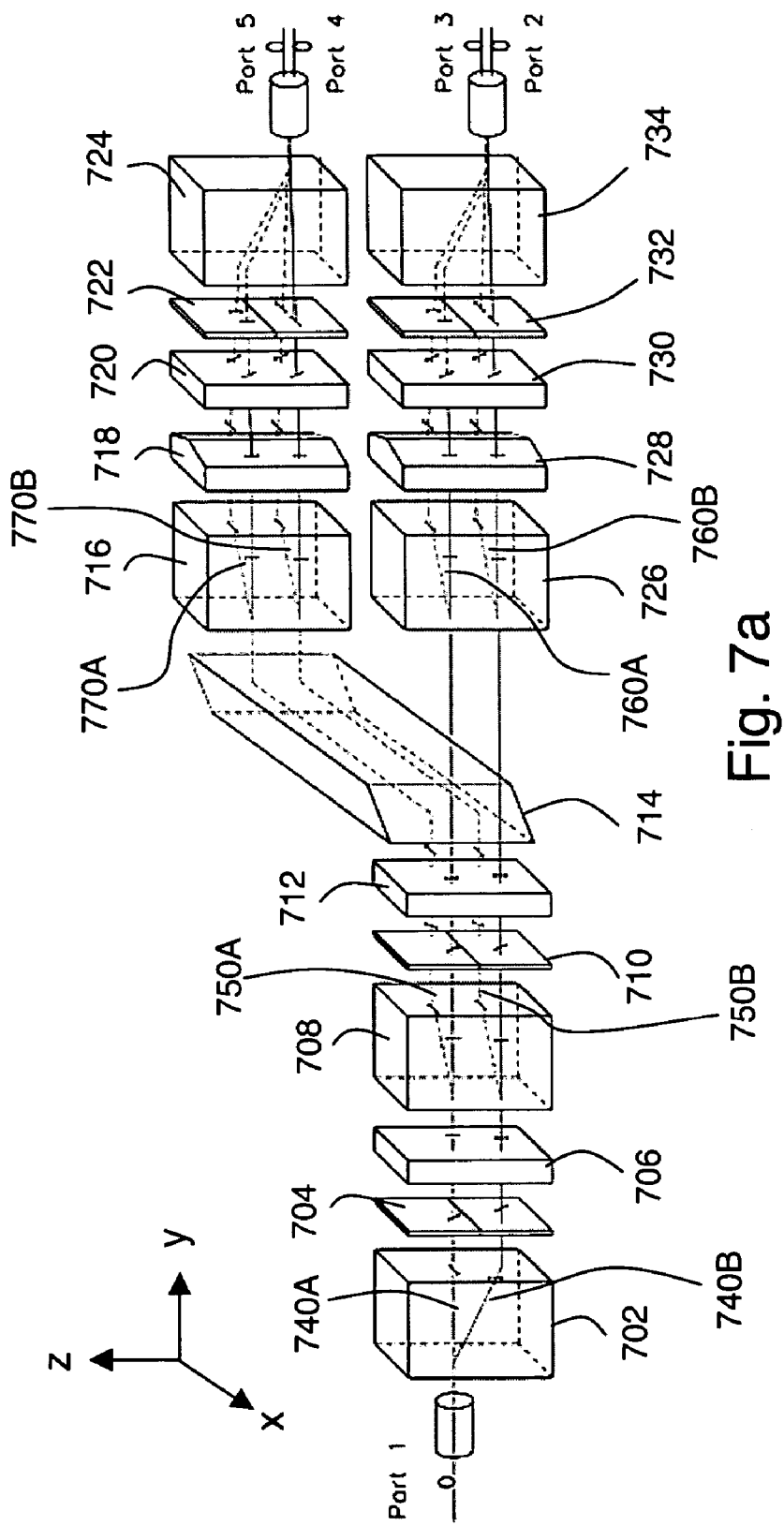
FIG. 7a is an isometric view of a one by four optical switch in accordance with an embodiment of the invention.

FIG. 7a shows another embodiment of the invention which is a one by four optical switch. A light beam from a fiber port 1 is incident on a birefringent splitter 702, which splits the incident beam into two orthogonally polarized beams 740A and 740B. These beams then pass through a compound half wave plate 704 that rotates the polarizations of beams 740A and 740B by +45 and −45 degrees respectively (or vice versa), so that both beams have the same polarization. The beams then pass through a controllable polarization rotator 706, which rotates the polarization by +45 degrees or −45 degrees, depending on a control input. Next the beams pass through a walkoff element 708. If beams 740A and 740B are z-polarized, they pass through walkoff element 708 without walkoff. If beams 740A and 740B are x-polarized, they pass through walkoff element 708 with walkoff, and exit as beams 750A and 750B respectively. The beams then pass through a compound half wave plate 710 that rotates the polarizations of beams 740A and 740B by +45 and −45 degrees respectively and rotates the polarizations of beams 750A and 750B by +45 and −45 degrees respectively (or vice versa) so that beams 740A,B have the same polarization, as do beams 750A,B. Beams 740A,B and 750A,B then pass through a controllable polarization rotator 712, which rotates the polarization by +45 degrees or −45 degrees, depending on a control input.

Beams 750A,B are further separated from beams 740A,B by passage through a rhomboid prism 714. A pair of parallel mirrors can also be used to perform the beam separation function of prism 714. Beams 750A,B next pass through a walkoff element 716. If beams 750A,B are z-polarized, they pass through walkoff element 716 without walkoff. If beams 750A and 750B are x-polarized, they pass through walkoff element 716 with walkoff, and exit as beams 770A and 770B respectively. Beams 750A,B and 770A,B pass through light bending device 718. Light bending device 718 deflects these beams so that they make an angle θ with respect to the y-axis. The angle θ is selected to provide efficient coupling into fiber ports 4 and 5, as on FIG. 5.

If the beams exiting light bending device 718 are beams 770A,B, the polarization of these beams is rotated by −45 degrees by a controllable polarization rotator 720. Beams 770A,B then pass through a compound half wave plate 722 which rotates the polarization of beams 770A and 770B by −45 degrees and +45 degrees respectively. Beams 770A and 770B are then combined in a birefringent combiner 724 and coupled to fiber port 4.

If the beams exiting light bending device 718 are beams 750A,B, the polarization of these beams is rotated by +45 degrees by the controllable polarization rotator 720. Beams 750A,B then pass through the compound half wave plate 722 which rotates the polarization of beams 750A and 750B by −45 degrees and +45 degrees respectively. Beams 750A and 750B are then combined in the birefringent combiner 724 and coupled to fiber port 5.

Beams 740A,B are switchably coupled to fiber port 2 or 3 by splitter 726, light deflector 728, rotator 730, compound half wave plate 732 and combiner 734 in the same way that beams 750A,B are switchably coupled to fiber port 4 or 5. Thus the arrangement of FIG. 7a is a one by four optical switch. Rotator 706 determines whether the input is coupled to output 2 or 3, or to output 4 or 5. Rotator 712 selects between outputs 2 and 3 (or between outputs 4 and 5).

Figure 7B:
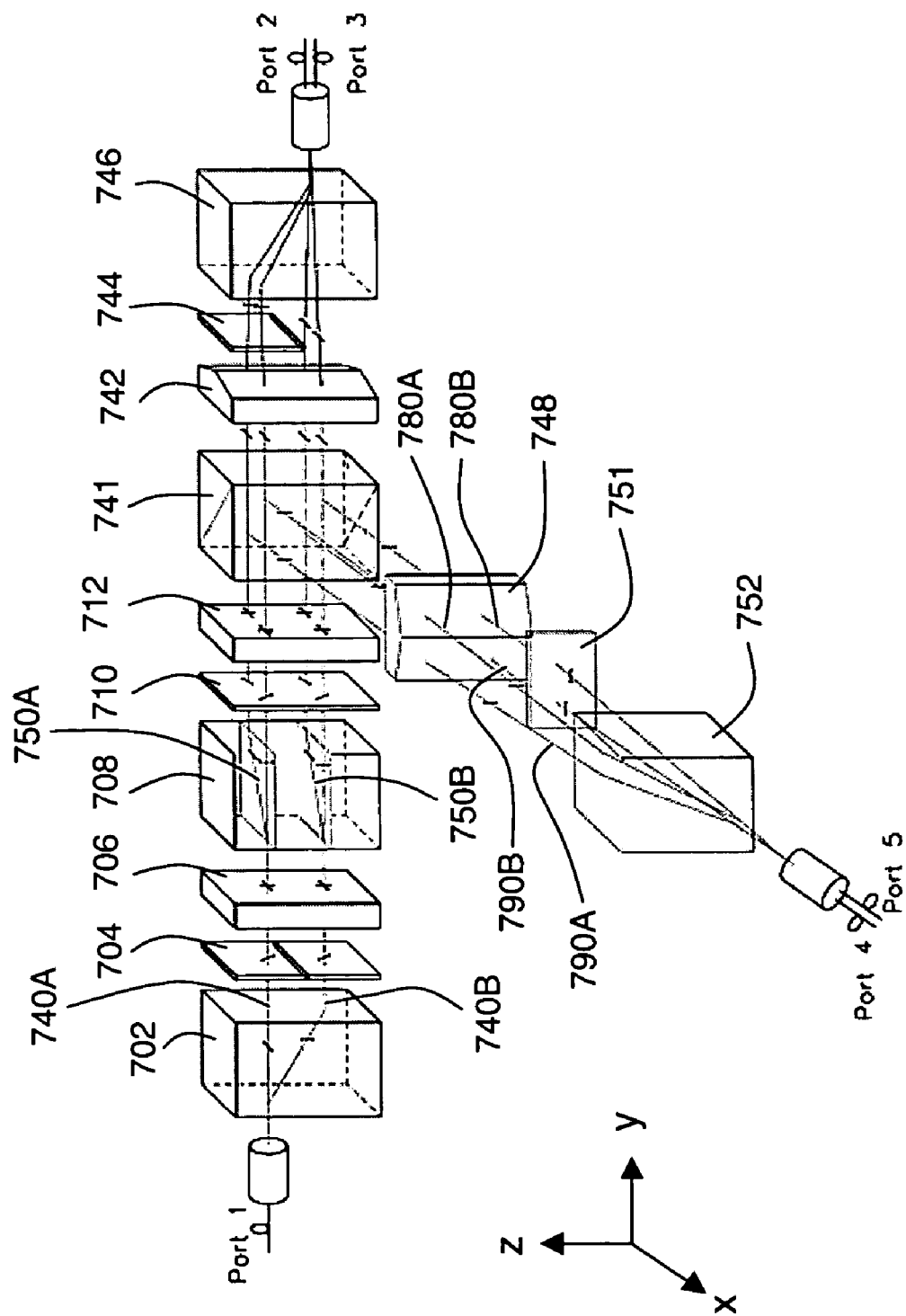
FIG. 7b is an isometric view of a one by four optical switch in accordance with another embodiment of the invention.

FIG. 7b shows a one by four optical switch similar to the switch of FIG. 7a, where a polarizing beamsplitter (PBS) 740 is used instead of prism 714 to separate the beams. Elements 702, 704, 706, 708, 710 and 712 operate as indicated in connection with FIG. 7a.

If the beams exiting rotator 712 are x-polarized, they are transmitted through PBS 741. Beams 740A,B and 750A,B next pass through light bending device 742. Light bending device 742 deflects these beams so that they make an angle θ with respect to the y-axis. The angle θ is selected to provide efficient coupling into fiber ports 2 and 3, as on FIG. 5. Beams 740A and 750A pass through a half wave plate 744, which rotates their polarization by 90 degrees. Beams 740A and 740B are then combined in a birefringent combiner 746 and coupled to fiber port 2. Similarly, beams 750A and 750B are combined in the birefringent combiner 746 and coupled to fiber port 3.

If the beams exiting rotator 712 are z-polarized, they are reflected in PBS 741. Beams 780A,B and beams 790A,B correspond to beams 740A,B and beams 750A,B respectively. Beams 780A,B and 790A,B are switchably coupled to fiber ports 4 and 5 by light deflector 748, wave plate 751 and combiner 752 in the same way that beams 740A,B and 750A,B are switchably coupled to fiber ports 2 and 3. Thus the arrangement of FIG. 7b is also a one by four optical switch. Rotator 706 determines whether the input is coupled to output 2 or 3, or to output 4 or 5. Rotator 712 selects between outputs 2 and 3 (or between outputs 4 and 5).

Figure 8B:
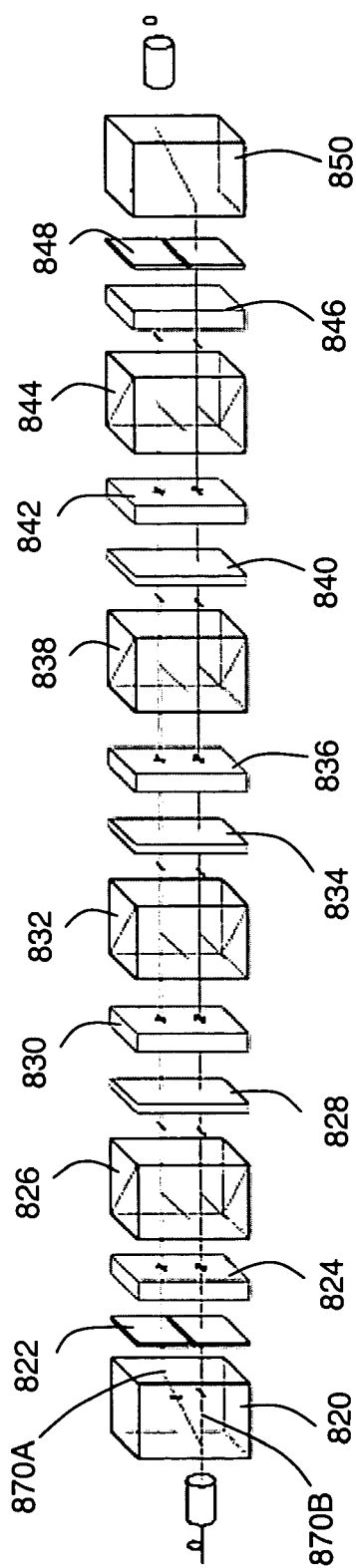

FIG. 8a shows an adjustable time delay element according to an embodiment of the invention. A fiber input is collimated by an input subassembly 802 to provide optical beams 870A,B. Optical beams 870A,B pass through PBS 826, PBS 832, PBS 838 and PBS 844 and are then coupled to an output fiber by an output subassembly 804. Polarization control components are placed in beams 870A,B such that at each PBS the beams either do or do not make a single pass through a corresponding fiber loop. Fiber loops 808, 810, 812 and 814 correspond to PBSs 826, 832, 838, and 844 respectively. It is preferable for the fiber loops to have delays which follow a binary geometric progression, as shown on FIG. 8a, where loops 808, 810, 812, and 814 have delays ΔT, 2ΔT, 4ΔT and 8ΔT respectively. Further details of the embodiment of FIG. 8a are shown on FIG. 8b, which is a view along line A—A on FIG. 8a.

On FIG. 8b, an input beam from an input fiber is collimated and split into beams 870A and 870B by a birefringent splitter 820. Beams 870A and 870B are then rotated by 45 degrees in opposite directions by a compound half wave plate 822. Beams 870A and 870B then have the same polarization, and pass through a controllable polarization rotator 824, which rotates the polarization by +45 degrees or −45 degrees, depending on a control input. If the beams exiting rotator 824 are horizontally polarized, they are transmitted through PBS 826 and do not pass through fiber loop 808. If the beams exiting rotator 824 are vertically polarized, they are reflected in PBS 826 and pass through fiber loop 808.

Figure 8D:
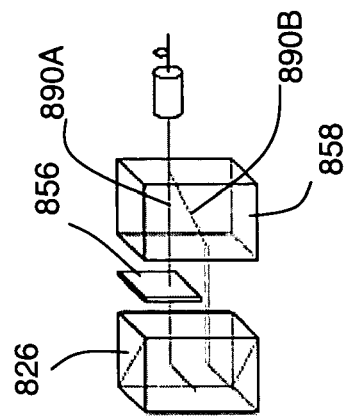
Figure 8C:
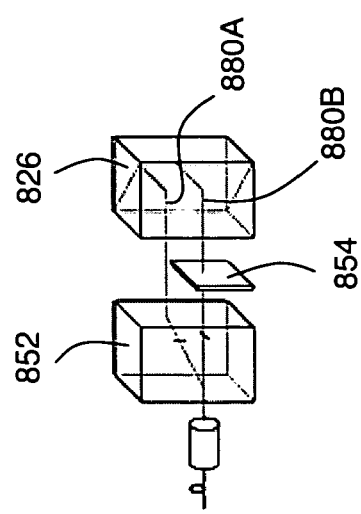

FIGS. 8c and 8d show how fiber loop 808 is coupled to PBS 826. On FIG. 8c (B—B view of Part B on FIG. 8a), reflection of beams 870A,B from PBS 826 gives rise to beams 880A,B. Beam 880B passes through a half wave plate 854 which rotates its polarization by 90 degrees. Beams 880A and 880B are then combined by a birefringent combiner 852 and coupled into the fiber loop. On FIG. 8d (B—B view of Part A on FIG. 8a), light from the fiber loop is split by a birefringent splitter 858 into orthogonally polarized beams 890A and 890B. Beam 890A passes through a half wave plate 856 which rotates its polarization by 90 degrees. Beams 890A and 890B now have the appropriate polarization (vertical in this example) to be reflected from PBS 826 toward output assembly 804.

Similarly, 45 degree waveplates 828, 834, and 840 combine with +/−45 degree rotators 830, 836, and 842 respectively to control beam switching at PBSs 832, 838, and 844 respectively into fiber loops 810, 812, and 814 respectively. Beams 870A,B exiting from PBS 844 can be either horizontally or vertically polarized. A +/−45 degree polarization rotator 846 rotates the polarization by +45 degrees or −45 degrees, depending on a control input. The beams then enter a compound half wave plate 848, which rotates the polarization of beams 870A and 870B by 45 degrees in opposite directions. Rotator 846 is set to ensure that beams 870A and 870B are horizontally and vertically polarized, respectively, after exiting from wave plate 848. Beams 870A and 870B are then combined by a birefringent combiner 850 and coupled to an output fiber.

Variable time delay is a key function in RF systems. This is presently accomplished by means of electronic time delay circuitry, that is intrinsically limited to a 180 degree phase shift, that is only 50 picoseconds time delay range at 10 GHz operation. Fiber optical time delay offers the solution to overcome this limitation. Fiber is an excellent medium for time delay generation, due to its low loss, independence of operational frequency, and immunity to electromagnetic field interference. However, previous design (e.g., U.S. Pat. No. 6,700,704) uses light travel in free-space to achieve variable optical delay. This type of approach has a very limited delay range (about a few centimeters) due to the fundamental light diffraction induced large loss. Our inventive design is advantageously based on using lowloss optical fiber loops to achieve variable time delay, resulting in significantly extended delay range (kilometers). Therefore, the new design provides a practical solution for a long time delay range device that has not been possible before.

Figure 9:
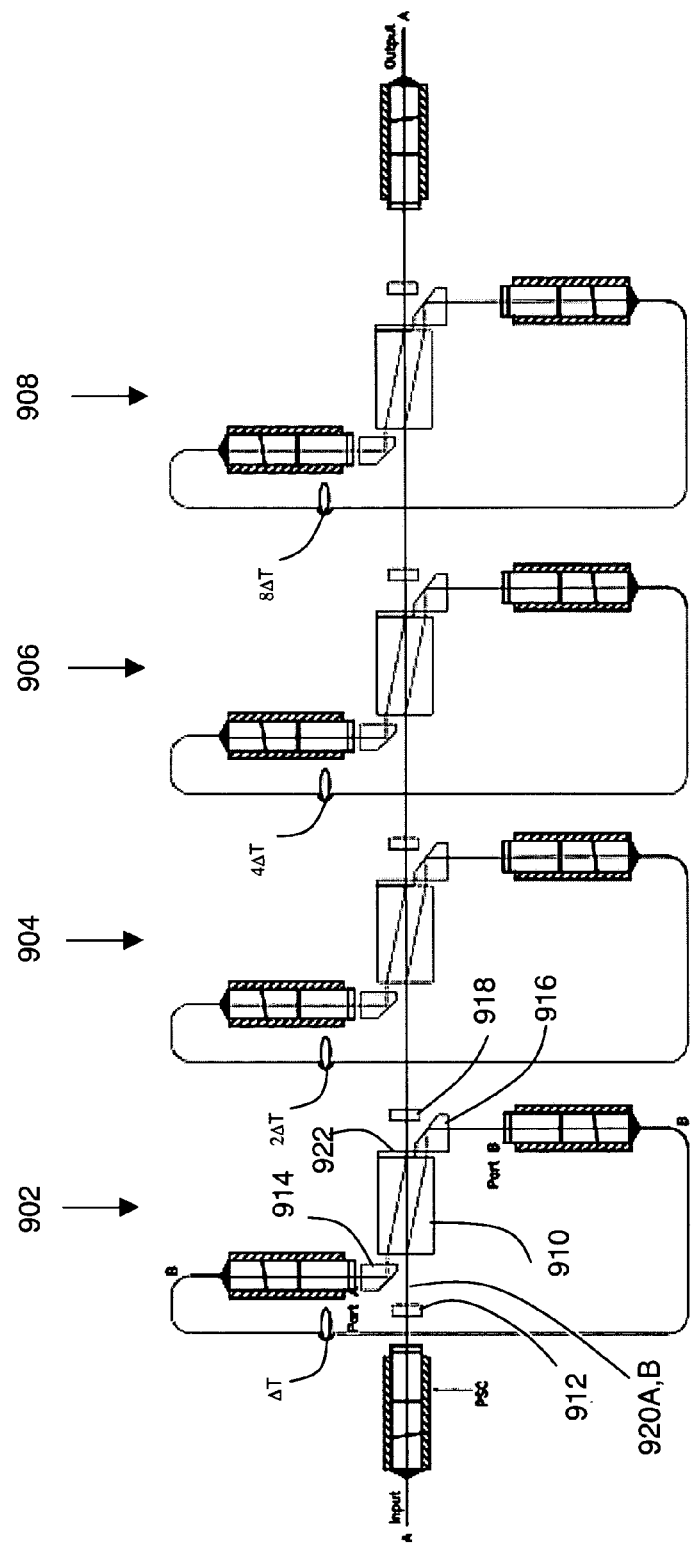
FIG. 9 is a plan view of a 4 bit optical time delay line using single fiber collimators and beam displacers in accordance with an embodiment of the invention.

FIG. 9 shows a time delay element similar to that of FIG. 8a, except that birefringent elements are used instead of PBSs as switching elements for fiber loops 902, 904, 906, and 908. On FIG. 9, beams 920A,B pass through a +/−45 degree rotator 912 and a birefringent walkoff element 910. Beams 920A,B entering element 910 are either ordinary waves (no walkoff) or extraordinary waves (walkoff). If walkoff occurs, the beams make a pass through fiber loop 902 guided by prisms 914 and 916 as shown. If no walkoff occurs, the beams do not make a pass through fiber loop 902. Beams exiting walkoff element 910 pass through a 45 degree half wave plate 922. A +/−45 degree polarization rotator 918 controls whether or not light passes through fiber loop 904 in the same way that rotator 912 controls fiber loop 902. Fiber loops 906 and 908 are also controlled in the same way.

Figure 10:
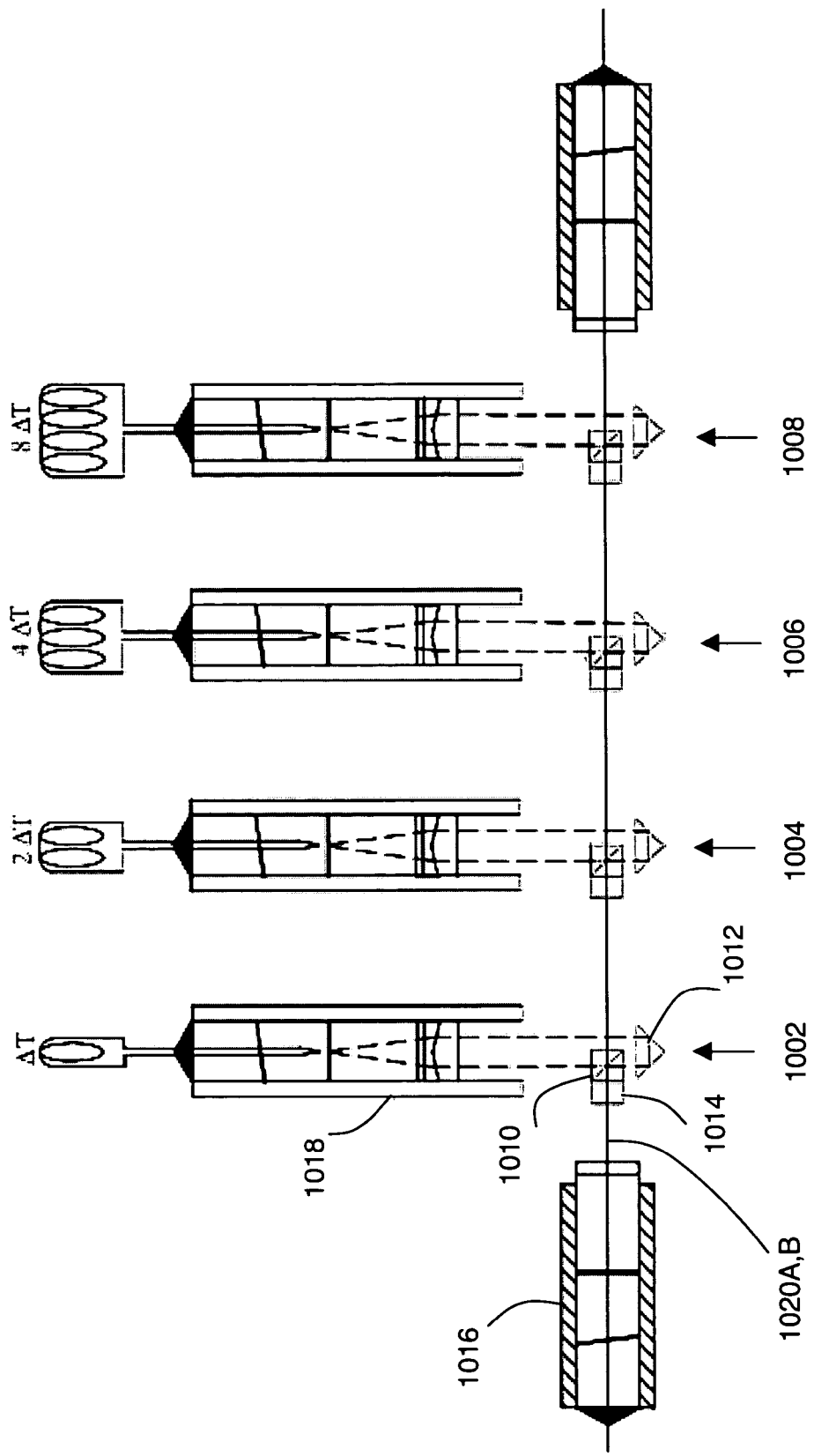
FIG. 10 is a plan view of a 4 bit optical time delay line using dual fiber collimators, PBSs and right angle prisms in accordance with an embodiment of the invention.

FIG. 10 shows a time delay element similar to that of FIG. 8a, except that dual fiber collimators are employed in the fiber loops. Input assembly 1016 provides beams 1020A,B, which have their polarization rotated by rotator 1014 to either transmit through PBS 1010 or reflect within PBS 1010. A prism 1012 provides "same side" coupling for dual fiber collimator 1018, which can have the structure shown on FIG. 5. Fiber loops 1004, 1006, and 1008 are controlled in the same way as fiber loop 1002.

Figure 11:
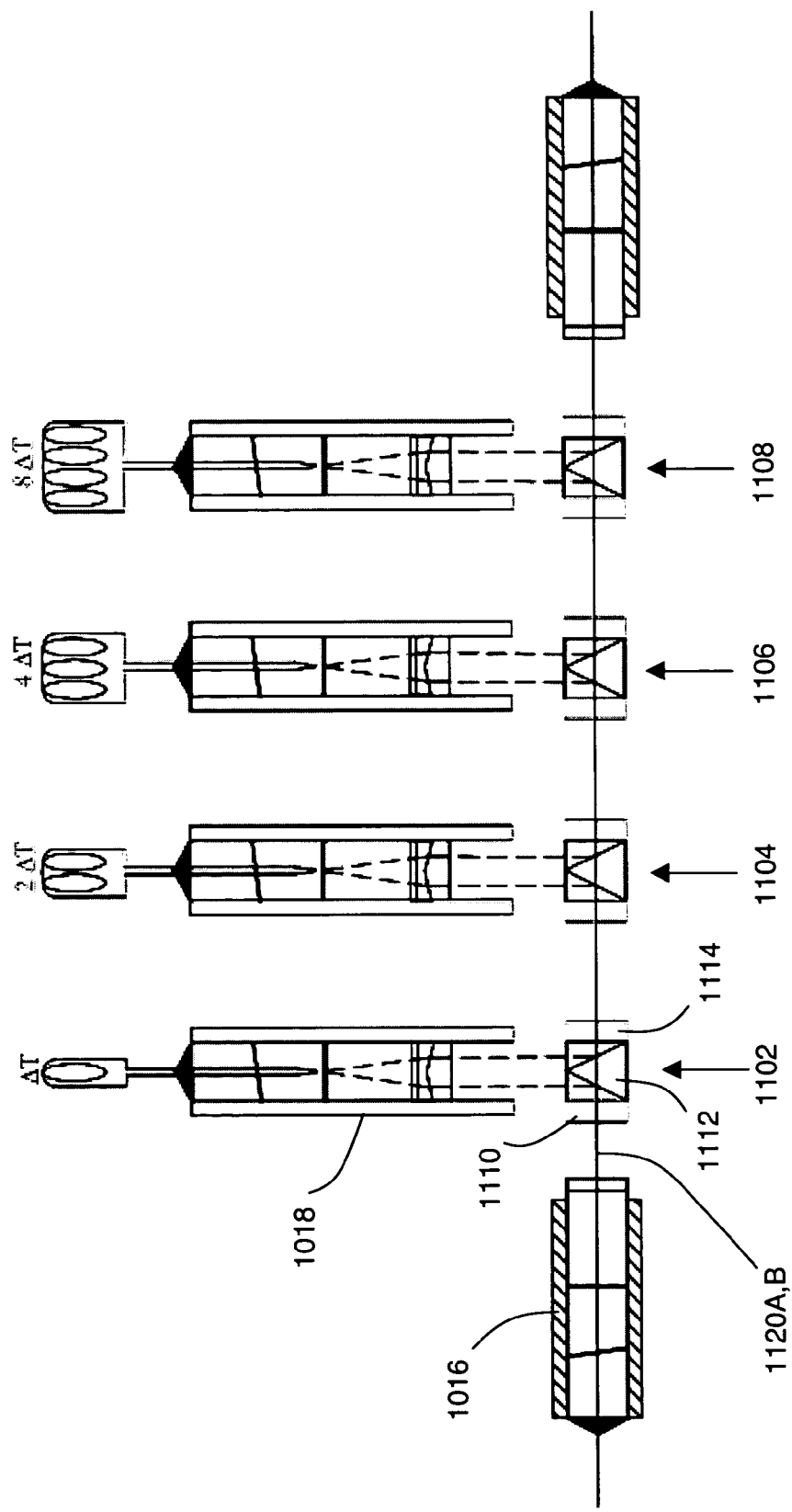
FIG. 11 is a plan view of an 4 bit optical time delay line using dual fiber collimators and PBSs in accordance with an embodiment of the invention.

FIG. 11 shows a time delay element similar to that of FIG. 10, except that a different PBS configuration is used. Input assembly 1016 provides beams 1120A,B which have their polarization rotated by rotator 1110 to either transmit through PBS 1112 or reflect from PBS 1112. The PBS configuration of FIG. 11 provides "same side" coupling for dual fiber collimator 1018 without the need for separate prisms as on FIG. 10. Fiber loops 1104, 1106, and 1108 are controlled in the same way as fiber loop 1102.

Figure 12A:
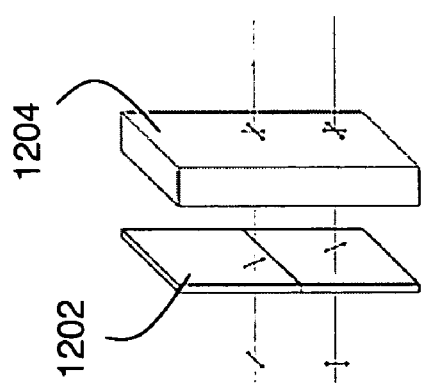
FIGS. 12a–b show two different polarization rotators suitable for use in embodiments of the invention.
Figure 12B:
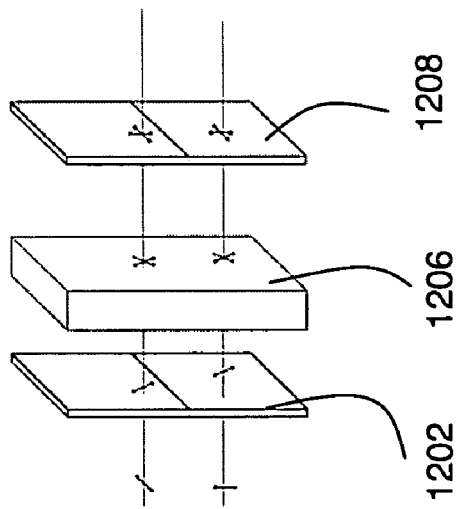

FIGS. 12a–b shows two ways to implement polarization rotators as used in the above examples. FIG. 12a shows a magneto-optic approach for the polarization rotator. Two orthogonally polarized input beams are received by a compound half wave plate 1202. Compound half wave plate 1202 rotates the polarization of these beams by 45 degrees in opposite directions, so that they have the same polarization. Next, these beams pass through a +/−45 degree Faraday rotator, which rotates the beam polarization by +45 degrees or −45 degrees, depending on an electrical input to the Faraday rotator 1204. The beams exiting from Faraday rotator 1204 have the same polarization, which is either horizontal or vertical, depending on the input to Faraday rotator 1204.

FIG. 12b shows an electro-optic approach for the polarization rotator. Two orthogonally polarized input beams are received by a compound half wave plate 1202. Compound half wave plate 1202 rotates the polarization of these beams by 45 degrees in opposite directions, so that they have the same polarization. Next, these beams pass through an electro-optic rotator (or retarder) 1206, which rotates the beam polarization by 0 degrees or 90 degrees, depending on an electrical input to the rotator 1206. The beams then pass through a half wave plate 1208, which rotates the polarization of both beams by 45 degrees (either clockwise or counter-clockwise). The beams exiting from wave plate 1208 have the same polarization, which is either horizontal or vertical, depending on the input to rotator 1206.

Thus the polarization rotators of FIGS. 12a and 12b are equivalent (for light traveling from left to right on FIGS. 12a–b), and so either approach can be used interchangeably for any of the polarization rotators in the above examples. More specifically, the combination of electro-optic retarder 1206 and wave plate 1208 is equivalent to Faraday rotator 1204 for the purposes of this invention.

The above embodiments are exemplary, and many variations are possible. For example, details of geometrical configuration, polarization direction and polarization rotation sense in the above examples can be varied within the scope of the invention. Also, switches according to the invention (including the above examples) can be unidirectional (if magneto-optic polarization rotators are used) or bidirectional (if electro-optic polarization rotators are used). Another example of such a variation would be a four by one switch analogous to the one by four switches of FIGS. 7a–b.

What is claimed is:

1. An optical switch comprising:
   a) N≧4 first optical ports including a first dual fiber collimator providing two of said first ports, wherein said dual fiber collimator comprises:
      i) two optical fibers disposed parallel to each other and corresponding to said two of said first ports;
      ii) a single lens optically disposed such that two tilted collimated beams on a side of the lens facing away from said fibers are coupled to said fibers by said single lens;
      iii) a polarization independent light deflecting device disposed such that two parallel collimated beams on a side of said deflecting device facing away from said fibers are optically coupled to said tilted collimated beams by said deflecting device, wherein said parallel collimated beams are parallel to said fibers;
   b) M≧1 second optical ports;
   c) a switching subassembly comprising one or more controllable polarization rotators, wherein said switching subassembly can provide switchable optical coupling between any one of said first ports and any one of said second ports depending on control inputs to said polarization rotators.

2. The optical switch of claim 1, wherein said first ports are input ports and said second ports are output ports.

3. The optical switch of claim 1, wherein said first ports are output ports and said second ports are input ports.

4. The optical switch of claim 1, wherein at least one of said polarization rotators comprises an electro-optic polarization rotator.

5. The optical switch of claim 1, wherein at least one of said polarization rotators comprises a magneto-optic polarization rotator.

6. The optical switch of claim 1, wherein said switching subassembly includes a polarization beam splitter for directing beams to different paths according to the polarization of said beams.

7. The optical switch of claim 1, wherein said switching subassembly includes a rhomboid prism or a pair of parallel mirrors for increasing beam separation.

8. The optical switch of claim 1, wherein M=4 and N=4 and said first ports are input ports numbered 1,2,3,4 and said second ports are output ports numbered 5,6,7,8, and wherein said first dual fiber collimator corresponds to ports 1 and 2, the switch further comprising:
   a) second, third and fourth dual fiber collimators, wherein said second dual fiber collimator corresponds to ports 3 and 4, wherein said third dual fiber collimator corresponds to ports 5 and 6, wherein said fourth dual fiber collimator corresponds to ports 7 and 8, each of said second, third and fourth dual fiber collimators comprising:
      i) two optical fibers disposed parallel to each other and corresponding to said corresponding ports;
      ii) a single lens optically disposed such that two tilted collimated beams on a side of the lens facing away from said fibers are coupled to said fibers by said single lens;
      iii) a polarization independent light deflecting device disposed such that two parallel collimated beams on a side of said deflecting device facing away from said fibers are optically coupled to said tilted collimated beams by said deflecting device, wherein said parallel collimated beams are parallel to said fibers;
   b) a polarization beam splitter within said switching subassembly disposed such that light having a first polarization is transmitted through said beam splitter from said first dual collimator toward said third dual collimator and/or from said second dual collimator toward said fourth dual collimator and light having a second polarization orthogonal to said first polarization is reflected within said beam splitter from said first dual collimator toward said fourth dual collimator and/or from said second dual collimator toward said third dual collimator.

9. The optical switch of claim 1, wherein M=4 and N=1 and said first ports are output ports numbered 2,3,4,5 and said second port is an input port, and wherein said first dual fiber collimator corresponds to ports 2 and 3, the switch further comprising:
   a) a second dual fiber collimator, wherein said second dual fiber collimator corresponds to ports 4 and 5, said second dual fiber collimators comprising:
      i) two optical fibers disposed parallel to each other and corresponding to ports 4 and 5;
      ii) a single lens optically disposed such that two tilted collimated beams on a side of the lens facing away from said fibers are coupled to said fibers by said single lens;
      iii) a polarization independent light deflecting device disposed such that two parallel collimated beams on a side of said deflecting device facing away from said fibers are optically coupled to said tilted collimated beams by said deflecting device, wherein said parallel collimated beams are parallel to said fibers.

10. The optical switch of claim 9, wherein said switching subassembly further comprises a polarization beam splitter for switchably directing light from said input port toward said first fiber collimator or toward said second fiber collimator, depending on the polarization of said light.

11. The optical switch of claim 9, wherein said switching subassembly further comprises a rhomboid prism or a pair of parallel mirrors.

12. An optical time delay element comprising:
   a) an input fiber collimator for receiving an arbitrarily polarized optical input from an input optical fiber and for providing two parallel and orthogonally polarized input beams;
   b) N≧2 switchable delay loops, each of said delay loops including:
      i) a four port polarization dependent switching element having ports 1, 2, 3, and 4, wherein light of a first polarization is coupled from port 1 to port 3 and from port 2 to port 4, and light of a second polarization is coupled from port 1 to port 4 and from port 2 to port 3;
      ii) a fiber loop optically coupling port 2 of said switching element to port 4 of said switching element, whereby said fiber loop provides a corresponding time delay;
      iii) an adjustable polarization control element disposed to alter the polarization of light entering port 1 of said switching element;
   c) an output fiber collimator receiving two parallel and orthogonally polarized output beams and coupling said output beams to an output optical fiber;
wherein said switching elements are optically coupled in a linear sequence indexed by an integer "j" such that said input beams are received by port 1 of switching element 1, said output beams are provided by port 3 of switching element N, and port 1 of switching element j is optically coupled to port 3 of switching element j−1 for 2≦j≦N;
and further wherein at least one of said fiber loops comprises a dual fiber collimator including:
   i) two optical fibers disposed parallel to each other and corresponding to an input and an output of said at least one fiber loop;
   ii) a single lens optically disposed such that two tilted collimated beams on a side of said single lens facing away from said optical fibers are optically coupled to said optical fibers by said single lens; and
   iii) a polarization independent light deflecting device disposed such that two parallel collimated beams on a side of said light deflecting device facing away from said optical fibers are optically coupled to said tilted collimated beams by said light deflecting device, such that said parallel collimated beams are parallel to said optical fibers.

13. The optical time delay element of claim 12, wherein at least one of said switching elements comprises a polarization beam splitter.

14. The optical time delay element of claim 12, wherein at least one of said switching elements comprises a birefringent walkoff element.

15. The optical time delay element of claim 12, wherein at least one of said polarization control elements comprises an electro-optic polarization rotator.

16. The optical time delay element of claim 12, wherein at least one of said polarization control elements comprises a magneto-optic polarization rotator.

17. The optical time delay element of claim 12, wherein said time delays form a binary geometric progression.

18. The optical time delay element of claim 12, wherein one of said switching elements corresponding to said dual fiber collimator comprises a polarization beam splitter having ports 2 and 4 facing said dual fiber collimator.

19. The optical time delay element of claim 12, wherein one of said switching elements corresponding to said dual fiber collimator comprises a polarization beam splitter and a prism for directing ports 2 and 4 of said one of said switching elements toward said dual fiber collimator.

* * * * *